United States Patent
Schwab et al.

(10) Patent No.: US 12,510,691 B2
(45) Date of Patent: Dec. 30, 2025

(54) EXTERNAL COMPONENT OF A WATCH OR OF AN ITEM OF JEWELLERY AND METHOD FOR MANUFACTURING SUCH AND EXTERNAL COMPONENT

(71) Applicant: Montres Breguet S.A., L'Abbaye (CH)

(72) Inventors: Anthony Schwab, Areuse (CH); Lucien Germond, Giez (CH); Ludovic Charvier, Montricher (CH); Vincent Laucella, Le Brassus (CH)

(73) Assignee: Montres Breguet S.A., L'Abbaye (CH)

( * ) Notice: Subject to any disclaimer, the term of this patent is extended or adjusted under 35 U.S.C. 154(b) by 416 days.

(21) Appl. No.: 18/098,323

(22) Filed: Jan. 18, 2023

(65) Prior Publication Data
US 2023/0244001 A1    Aug. 3, 2023

(30) Foreign Application Priority Data
Feb. 2, 2022  (EP) ..................................... 22154700

(51) Int. Cl.
*G02B 1/11* (2015.01)
*A44C 27/00* (2006.01)
*G04B 19/12* (2006.01)

(52) U.S. Cl.
CPC ................ *G02B 1/11* (2013.01); *A44C 27/00* (2013.01); *G04B 19/12* (2013.01)

(58) Field of Classification Search
CPC ......... G02B 1/11; A44C 27/00; A44C 27/005; A44C 25/00; G04B 19/12; G04B 19/10; G04B 19/103; G04B 45/0076; G04B 47/04; G04D 3/0069

USPC .......................................................... 359/601
See application file for complete search history.

(56) References Cited

U.S. PATENT DOCUMENTS

| | | | |
|---|---|---|---|
| 2005/0185518 A1* | 8/2005 | Kawakami | C23C 14/0015 368/232 |
| 2009/0268566 A1 | 10/2009 | Hiroe et al. | |
| 2015/0160615 A1* | 6/2015 | Beugin | G04B 17/325 368/323 |
| 2019/0302697 A1 | 10/2019 | Larriere et al. | |
| 2019/0357639 A1* | 11/2019 | Rannoux | B29C 48/21 |

(Continued)

FOREIGN PATENT DOCUMENTS

| | | |
|---|---|---|
| EA | 0 114 565 A1 | 8/1984 |
| EA | 3 037 897 A1 | 6/2016 |

(Continued)

OTHER PUBLICATIONS

European Search Report for 22 15 4700 dated Jun. 28, 2022.

*Primary Examiner* — Mohammed A Hasan
(74) *Attorney, Agent, or Firm* — Sughrue Mion, PLLC

(57) ABSTRACT

An external component (10) of a watch or of an item of jewellery, including a substrate (100) produced in a transparent material, said substrate (100) comprising an inner face (101) opposite an outer face (102), the external component (10) being characterised in that the inner face (101) has a structuring (103) extending over its entire surface, said external component (10) comprising at least one metallic layer, referred to as "inner metallic layer" (104) deposited on a portion of the surface of the inner face (101), so as to form a decoration, the portion(s) of the surface of the inner face (101) not covered by the inner metallic layer (104) being covered by an anti-reflection coating (107).

11 Claims, 1 Drawing Sheet

(56) References Cited

U.S. PATENT DOCUMENTS

| | | | |
|---|---|---|---|
| 2021/0170659 A1* | 6/2021 | Célérier | ................ B29C 48/07 |
| 2023/0126038 A1* | 4/2023 | Lintymer | ............... G04B 39/00 |
| 2023/0200504 A1* | 6/2023 | Karapatis | .............. C22C 45/003 |
| | | | 420/423 |
| 2023/0251605 A1* | 8/2023 | Lintymer | ............. G04D 3/0092 |
| | | | 368/232 |

FOREIGN PATENT DOCUMENTS

| | | | |
|---|---|---|---|
| JP | 2002-148360 A | | 5/2002 |
| JP | 2006-275992 A | | 10/2006 |
| JP | 2008-164402 A | | 7/2008 |
| JP | 2009-79942 A | | 4/2009 |
| JP | 2015-161618 A | | 9/2015 |
| JP | 2015161616 A | * | 9/2015 |
| JP | 2020-501148 A | | 1/2020 |
| JP | 2020-85519 A | | 6/2020 |

* cited by examiner

EXTERNAL COMPONENT OF A WATCH OR OF AN ITEM OF JEWELLERY AND METHOD FOR MANUFACTURING SUCH AND EXTERNAL COMPONENT

CROSS REFERENCE TO RELATED APPLICATION

This application claims priority to European Patent Application No. 22154700.3 filed Feb. 2, 2022, the entire contents of which are incorporated herein by reference.

TECHNICAL FIELD OF THE INVENTION

The invention falls within the field of horology or of jewellery, and more particularly relates to an external component of a watch or of an item of jewellery and a method for manufacturing such an external component.

TECHNOLOGICAL BACKGROUND

In particular, in the field of horology, the external components for watches, particularly the dials, generally have decorations produced from thin layers deposited on the surface of a substrate.

Depending on their level of details particularly, these decorations may be complex to produce and require a level of precision that is difficult to achieve by manual work. Therefore, the use of automated tools, for example digital-control machining means may then be necessary for the production of decorations, which may be incompatible with the manufacturing of luxury watches, which is characterised by the implementation of arts and crafts skills so as to obtain unique watches.

Moreover, it is possible that certain decorations are not technically producible, even through the use of automated tools due to their complexity and to the precision required for their production.

Within this context, the aim of the present invention is to produce an external component of a watch, particularly of a dial, a crystal or a back crystal, having complex decorations.

More generally, the present invention addresses the same problem in the field of jewellery insofar as it aims to simplify the production of an item of jewellery having complex decorations.

SUMMARY OF THE INVENTION

The invention resolves the above-mentioned drawbacks and relates, to this end, to an external component of a watch or of an item of jewellery, comprising a substrate produced in a transparent material, said substrate comprising an inner face opposite an outer face. One of the inner or outer faces has a structuring extending over its entire surface, said external component comprising at least one metallic layer deposited on a portion of the structuring, so as to form a decoration, the portion(s) of the structuring not covered by the inner metallic layer being covered with an anti-reflection coating.

The invention makes it possible to produce the structuring by any method adapted to generate reliefs or asperities on the surface of the inner face. Indeed, the effect of the anti-reflection coating is to annihilate the visual appearance of the structuring present on the portion(s) of the surface of the inner face not covered by the metallic layer, which authorises the manual production of the structuring for example.

More specifically, it is sought by the present invention to mask the possible structuring of the inner face on the portion(s) of its surface that are not covered by the metallic layer, so that only the metallic layer, which is transparently visible through the substrate, has a textured appearance. In other words, the invention makes it possible to guarantee the transparency of the entire external component, with the exception of the metallic layers. It is understood that the invention authorises significant freedom in the production of the structuring.

The aim of the structuring is to reduce the reflection of the light, in particular the specular reflection, caused by the metallic layer, in order to make said reflection more diffuse.

In particular embodiments, the invention may further include one or more of the following features, taken alone or according to any technically possible combinations.

In particular embodiments, the inner face includes the structuring over its entire surface, and includes the metallic layer, referred to as "inner metallic layer".

In particular embodiments, the outer face of the substrate is polished.

In particular embodiments, the external component comprises at least one metallic layer, referred to as "outer metallic layer", deposited on a portion of the surface of the outer face of the substrate, said outer metallic layer being covered with an anti-reflection coating covering said outer face or being deposited on said anti-reflection coating covering said outer face.

In particular embodiments, the inner metallic layer is covered with the anti-reflection coating.

According to another aspect, the present invention relates to a dial, a crystal or a back crystal of a watch formed by an external component such as described above.

According to yet another aspect, the present invention relates to a method for manufacturing an external component of a watch or of an item of jewellery comprising the following steps:

structuring the entire surface of an inner face of a substrate so as to generate a structuring, depositing at least one metallic layer referred to as "inner metallic layer" on a portion of the surface of the inner face, so as to form a decoration, depositing an anti-reflection coating on the inner face of the substrate, at least on the portion(s) of the inner face of the substrate not covered by the inner metallic layer.

In particular implementations, the method includes a step of depositing a metallic layer referred to as "outer metallic layer" on a portion of the outer face of the substrate, so as to form a decoration, said deposition step being performed before or after a step of depositing an anti-reflection coating on the outer face.

In particular implementations, the outer face is polished during a preliminary polishing step.

In particular implementations, during the step of depositing the anti-reflection coating, the inner metallic layer is covered by the anti-reflection coating.

In particular implementations, the structuring step is implemented by laser machining or by mechanical machining.

BRIEF DESCRIPTION OF THE FIGURES

Other features and advantages of the invention will become apparent upon reading the following detailed description given by way of non-limiting example, with reference to the appended drawings wherein.

DETAILED DESCRIPTION OF THE INVENTION

Figure 1:
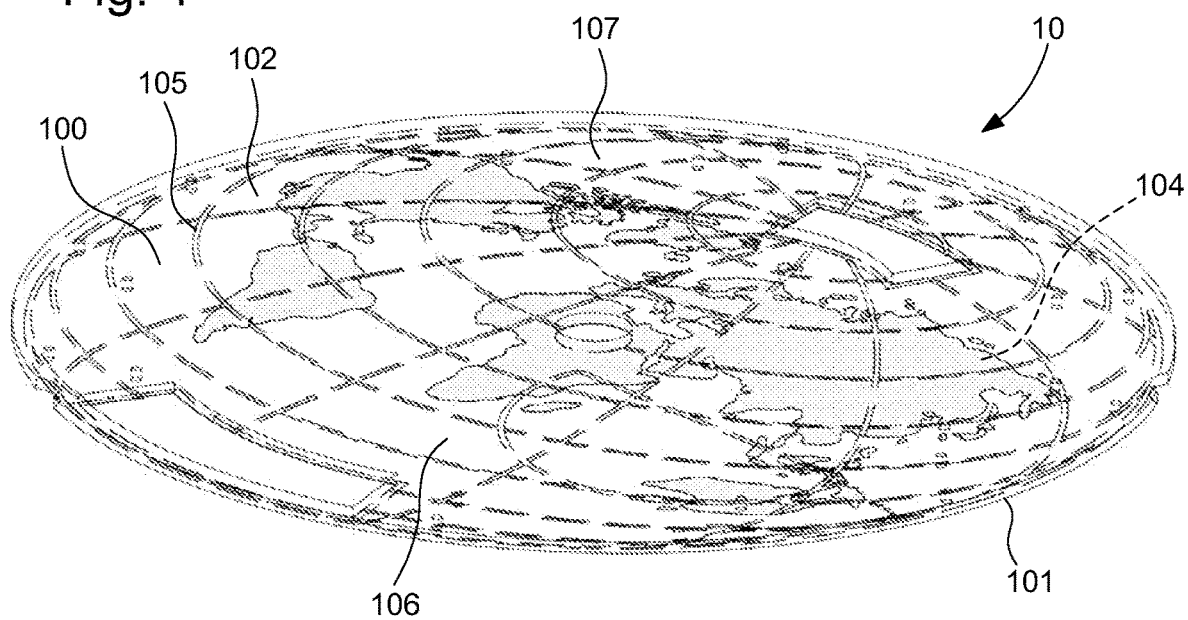
FIG. 1 shows a perspective view of an external component of a watch according to a preferred embodiment of the invention.

The present invention relates to an external component 10 of a watch or of an item of jewellery, such as shown in FIGS. 1 to 4 in embodiments.

The external component 10 comprises a substrate 100 produced in a transparent material, such as sapphire or glass. The substrate 100 is transparent in the meaning where it allows light to pass through the wavelength of which is at least located in the visible spectrum. The substrate 100 has an inner face 101 opposite an outer face 102.

In a preferred example of application of the invention, the external component 10 forms a dial, a crystal or a back crystal of a watch. The inner face 101 is then intended to be arranged facing a horological movement and the outer face 102 is intended to be arranged opposite a watch crystal.

Advantageously, the inner face 101 or the outer face 102 have a structuring 103 over its entire surface.

Figure 2:
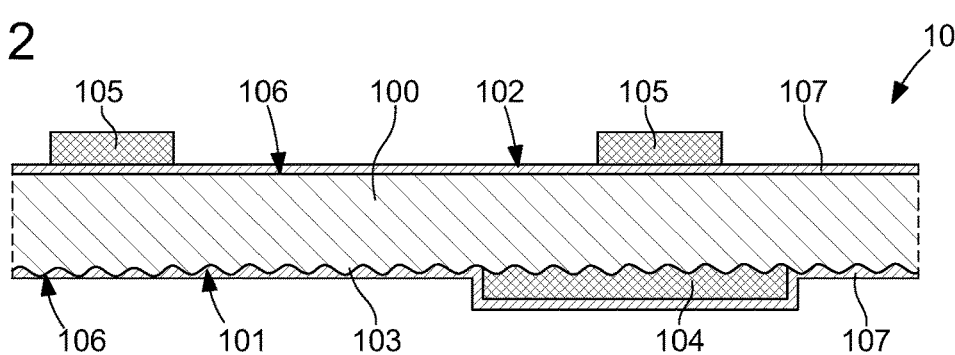
FIG. 2 schematically shows a cross-sectional view of the external component according to FIG. 1 according to a preferred embodiment of the invention.
Figure 3:
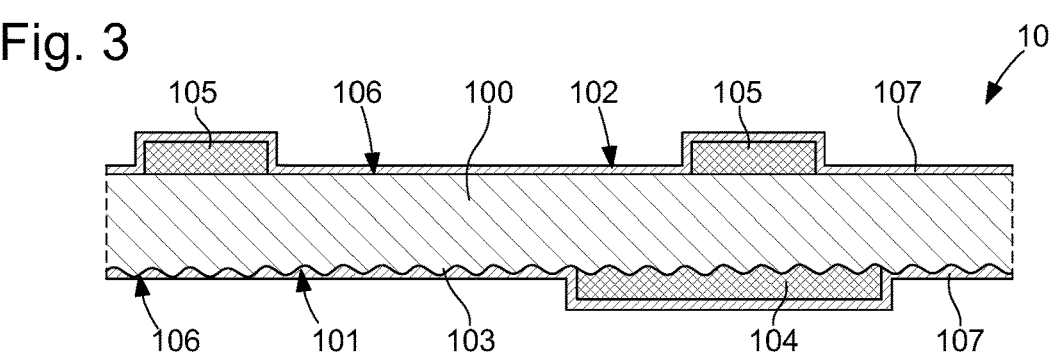
FIG. 3 schematically shows a cross-sectional view of the external component of FIG. 1 according to another embodiment of the invention.
Figure 4:
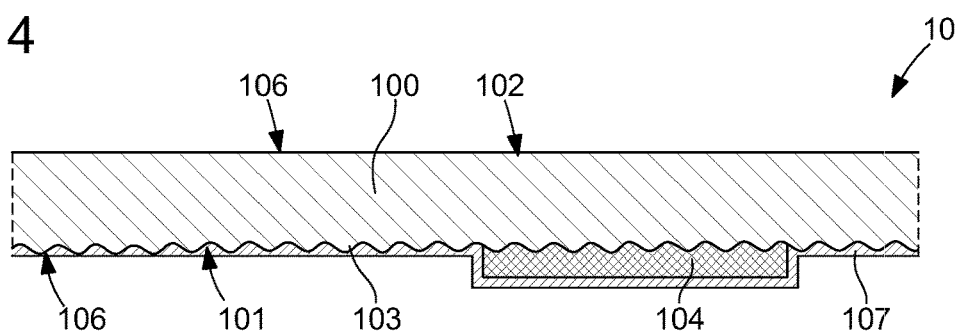
FIG. 4 schematically shows a cross-sectional view of the external component of FIG. 1 according to yet another embodiment of the invention.

Preferably, as can be seen schematically in FIGS. 2 to 4 in embodiments, the inner face 101 has the structuring 103. The structuring 103 may be produced by any material removal operation consisting in generating reliefs or asperities on the surface of the inner face 101 for example by engraving, engine-turning, etc., manually by a qualified operator, or by mechanical, chemical, laser machining, etc. Consequently, the structuring 103 may consist in engraving, machine-turning, satin finishing, etc., the inner face 101.

The structuring 103 of the inner face 101 extends over its entire surface, so as to simplify the structuring operation.

Moreover, in order to increase the transparency of the substrate 100, the outer face 102 may be polished preferably over its entire surface.

The external component 10 comprises, over at least one portion of the surface of the inner face 101, at least one metallic layer deposited so as to form a decoration. In the present application, it is described embodiments wherein the external component includes, on the surface of the inner face 101, a decoration formed by a single metallic layer. Of course, in other embodiments of the invention not described, a plurality of metallic layers may be superimposed or juxtaposed on said surface of the inner face 101.

More specifically, the metallic layer is deposited so as to materialise a graphic representation forming a decoration. The metallic layer may be produced from any metal material or from any metal material alloy or from any metal material oxide.

For example, the metallic layer may be made of chromium oxide or chromium, palladium, gold, silver, etc.

In the embodiments shown in FIGS. 1 to 3, the outer face 102 also has, on a portion of its surface, at least one metallic layer forming a decoration. In the present application, it is described embodiments wherein the external component includes, on the surface of the outer face 102, a decoration formed by a single metallic layer. Of course, in other embodiments of the invention not described, a plurality of metallic layers may be superimposed or juxtaposed on said surface of the outer face 102.

In the remainder of the text, the metallic layer deposited on the inner face 101 of the substrate 100 is called "inner metallic layer" 104, and the metallic layer deposited on the outer face 102 of the substrate 100 is called "outer metallic layer" 105.

An example of decoration formed by the inner 104 and outer metallic layers 105 is shown in perspective view in FIG. 1.

Furthermore, the portion(s) of the surface of the inner 101 and outer faces 102 of the substrate 100 that are not covered respectively by the inner 104 and outer metallic layers 105 are called "free areas" 106 in the present text.

Advantageously, all or part of the inner metallic layer 104 is visible for a user, as well as the structuring 103 of the inner face 101 on the portion of the surface that said inner metallic layer 104 covers. Thus, thanks to the structuring 103, the inner metallic layer 104 has a textured visual appearance (not shown in FIG. 1 for reasons of clarity of the figure) according to the reliefs or the asperities of said structuring 103.

The deposition of these inner 104 and outer metallic layers 105 respectively on the inner 101 and outer faces 102 of the substrate 100 makes it possible to easily generate rich decorations. More particularly, this feature makes it possible to add a depth effect between the two metallic layers, and therefore a depth effect to the decoration, said depth effect being proportional to the thickness of the substrate insofar as this distance separates the two inner 104 and outer 105 metallic layers from one another.

As schematically shown in the sectional view of FIGS. 2 to 4, the external component 10 includes an anti-reflection coating 107 covering all of the free areas 106 of the inner face 101. Preferably, as illustrated in the embodiments of FIGS. 2 to 4, the anti-reflection coating also extends over the entire outer face 102. In particular, the outer metallic layer 105 is, either deposited on said anti-reflection coating 107, as shown in FIG. 2, or covered by the anti-reflection coating 107, as shown in FIG. 3.

It should be noted that it is possible to only deposit the anti-reflection coating on a chosen surface, such as on the free areas 106 of the or one of the inner 101 and outer faces 102.

As shown in FIG. 4, it is also possible that the outer surface 105 does not include anti-reflection coating 107 and/or metallic layer. In other terms, the outer surface may include an anti-reflection coating 107, but no metallic layer, or may include a metallic layer, but no reflection coating 107, or may not include a metallic layer, or an anti-reflection coating 107.

The anti-reflection coating 107 may be of the same type as those used for watch crystals, which is well known to the person skilled in the art.

Advantageously, the effect of the anti-reflection coating 107 is to annihilate the visual appearance of the structuring 103 present on the free areas 106 of the inner face 101 of the substrate 100. In other terms, the anti-reflection coating 107, when it is deposited on the structuring 103 as shown in FIG. 2, generates an optical effect consisting in making the structuring 103 invisible to the naked eye, and consequently in making the substrate 100 uniformly transparent at the free areas 106, in the same way as if the inner face 101 had been polished in this location.

An external component 10 such as described above may be produced by implementing the following steps of a manufacturing method:
- structuring the entire surface of an inner face 101 of the substrate 100 so as to generate a structuring 103,
- depositing at least one inner metallic layer 104, and so as to form a decoration, on a portion of the inner face 101; in one embodiment of the invention, this step may include another metallic layer deposition operation consisting in depositing the outer metallic layer 105 on one portion of the outer face 102 of the substrate 100,
- depositing the anti-reflection coating 107 at least on the free areas 106 of the inner face 101, that is to say the portions of the inner face 101 not covered by the metallic layer. Preferably, the layer of anti-reflection coating 107 is also deposited on the inner metallic layer 104.

Advantageously, in one embodiment of the invention, an anti-reflection coating 107 may be deposited, either on the entire surface of the outer face 102, the possible outer metallic layer 105 then being deposited on said anti-reflection coating 107 of the outer face 102, as shown in FIG. 2, or on the outer metallic layer 105 as well as on the free areas 106 of the outer face 102, as shown in FIG. 3.

The inner metallic layer 104 and the possible outer metallic layer 105 are preferably deposited by a Physical Vapour Deposition (PVD) method.

The anti-reflection coating(s) 107 are preferably deposited by a plasma-enhanced physical vapour deposition method.

It should be noted that, in the embodiments shown in FIGS. 2 and 3, the chronology of the performance of depositions of the inner 104 and outer metallic layers 105 in relation to one another is of no importance, in the same way as that of the performance of depositions of the anti-reflection coatings 107 in relation to one another.

Advantageously, the outer face 102 is polished during a preliminary polishing step performed before or immediately after the implementation of the structuring step.

More generally, it should be noted that the implementations and embodiments considered above have been described by way of non-limiting examples, and that other variants are consequently possible.

In particular, in other embodiments of the invention, it should be noted that all of the arrangements relating to the inner face 101, to the inner metallic layer 104 and to the structuring 103 described above may be applied in a similar manner, to the outer face 102, to the outer metallic layer 105 and to a possible structuring of said outer face 102.

The invention claimed is:

1. An external component of a watch or of an item of jewellery, comprising:
- a substrate produced in a transparent material and including an inner face opposite an outer face, one of the inner or outer faces having a structuring formed within extending over its entire surface;
- a metallic layer deposited on a portion of the structuring, so as to form a decoration; and
- an anti-reflection coating covering at least a portion of the structuring not covered by the metallic layer.

2. The external component according to claim 1, wherein the inner face includes the structuring over its entire surface, and includes the metallic layer, corresponding to an inner metallic layer.

3. The external component according to claim 2, wherein the outer face of the substrate is polished.

4. The external component according to claim 2, wherein the metallic layer is deposited on a portion of the surface of the outer face of the substrate and corresponds to an outer metallic layer, said outer metallic layer being covered by an anti-reflection coating covering said outer face or being deposited on said anti-reflection coating covering said outer face.

5. The external component according to claim 2, wherein the inner metallic layer is covered by the anti-reflection coating.

6. A watch dial comprising an external component according to claim 1.

7. A method for manufacturing an external component of a watch or of an item of jewellery comprising the following steps:
- structuring an entire surface of an inner face of a substrate so as to generate a structuring within the inner face,
- depositing an inner metallic layer on a portion of the surface of the inner face, so as to form a decoration,
- depositing an anti-reflection coating on the inner face of the substrate, at least on a portion of the inner face of the substrate not covered by the inner metallic layer.

8. The manufacturing method according to claim 7, further comprising a step of depositing an outer metallic layer on a portion of the outer face of the substrate, so as to form a decoration, before or after a step of depositing an anti-reflection coating on the outer face.

9. The manufacturing method according to claim 7, wherein the outer face is polished during a preliminary polishing step.

10. The manufacturing method according to claim 8, wherein, during the step of depositing the anti-reflection coating, the inner metallic layer is covered by the anti-reflection coating.

11. The manufacturing method according to claim 10, wherein the structuring step is implemented by laser machining or by mechanical machining.

* * * * *